(12) United States Patent
Mattingly, Jr.

(10) Patent No.: US 7,188,992 B2
(45) Date of Patent: Mar. 13, 2007

(54) KNEADING ELEMENT AND RELATED ARTICLES

(75) Inventor: Joseph E Mattingly, Jr., Uniontown, OH (US)

(73) Assignee: Americhem, Inc., Cuyahoga Falls, OH (US)

( * ) Notice: Subject to any disclaimer, the term of this patent is extended or adjusted under 35 U.S.C. 154(b) by 187 days.

(21) Appl. No.: 10/630,210

(22) Filed: Jul. 30, 2003

(65) Prior Publication Data

US 2005/0024986 A1 Feb. 3, 2005

(51) Int. Cl.
*B29B 7/48* (2006.01)

(52) U.S. Cl. .......................................... 366/82; 366/85

(58) Field of Classification Search ............ 366/82–85, 366/96–99, 300–301; 425/204, 208, 209
See application file for complete search history.

(56) References Cited

U.S. PATENT DOCUMENTS

| | | | |
|---|---|---|---|
| 3,254,367 A | | 6/1966 | Erdmenger |
| 3,734,468 A | * | 5/1973 | Cheng et al. ............... 366/300 |
| 4,556,324 A | * | 12/1985 | Tynan .......................... 366/85 |
| 4,871,259 A | * | 10/1989 | Harada et al. .............. 425/209 |
| 4,938,605 A | | 7/1990 | Friedrich |
| 5,044,759 A | | 9/1991 | Gagliani |
| 5,048,971 A | | 9/1991 | Wall et al. |
| 5,100,240 A | * | 3/1992 | D'Alterio ..................... 366/99 |
| 5,267,788 A | | 12/1993 | Rockstedt |
| 5,292,186 A | * | 3/1994 | Kubo et al. ................... 366/97 |
| 5,314,245 A | | 5/1994 | Blach |
| 5,318,358 A | | 6/1994 | Wobbe et al. |
| 5,487,602 A | | 1/1996 | Valsamis et al. |
| 5,573,332 A | | 11/1996 | Weihrich et al. |
| 5,672,005 A | * | 9/1997 | Fukui et al. .................. 366/75 |
| 5,932,159 A | | 8/1999 | Rauwendaal |
| 5,947,593 A | * | 9/1999 | Inoue et al. ................... 366/85 |
| 5,984,516 A | * | 11/1999 | Inoue et al. ................ 425/204 |
| 6,048,088 A | | 4/2000 | Haring et al. |
| 6,116,770 A | | 9/2000 | Kiani et al. |
| 6,136,246 A | | 10/2000 | Rauwendaal et al. |

(Continued)

FOREIGN PATENT DOCUMENTS

DE     39 40 954 A1     12/1989

(Continued)

OTHER PUBLICATIONS

"Mischelemente in neuen Geometrien" by H. Potente, et al. vol. 88, No. 4, Apr. 1998 pp. 494-496 and 498-499.

(Continued)

*Primary Examiner*—Charles E. Cooley
(74) *Attorney, Agent, or Firm*—Renner, Kenner, Greive, Bobak, Taylor & Weber

(57) ABSTRACT

A modified kneading element for a screw extruder, peripherally congruent, aligned, and contiguous with a cross-sectional profile of a modified conveying element, includes a central portion defining a root diameter having a shaft receiving bore defined therein; and at least one lobe extending radially from the central portion, each lobe having an outer periphery ridge and first and second lateral sidewalls, wherein one of the lateral sidewalls of each lobe is concave between the outer periphery ridge and the central portion. Kneading blocks including such kneading elements and screw extruders including such kneading blocks are also provided.

22 Claims, 11 Drawing Sheets

U.S. PATENT DOCUMENTS

| | | | | |
|---|---|---|---|---|
| 6,170,975 B1 | * | 1/2001 | Andersen | 366/82 |
| 2005/0024986 A1 | * | 2/2005 | Mattingly, Jr. | 366/82 |

FOREIGN PATENT DOCUMENTS

| | | | |
|---|---|---|---|
| DE | 19706134 A1 | * | 11/1997 |
| DE | 102 07 145 A1 | | 2/2002 |
| GB | 769106 | | 2/1957 |
| JP | 57-15911 | * | 1/1982 |
| JP | 4-104827 | * | 4/1992 |
| JP | 6-90651 | * | 4/1994 |

OTHER PUBLICATIONS

Communication Relating to the Results of the Partial International Search.

* cited by examiner

KNEADING ELEMENT AND RELATED ARTICLES

TECHNICAL FIELD

This invention relates to kneading elements employed in screw-type extruders, and more particularly, to kneading elements used in conjunction with specially designed or modified conveying elements within screw-type extruders.

BACKGROUND OF THE INVENTION

Many commercial industries employ various mixing and extrusion mechanisms such as, for example, a screw extruder, in a variety of processing operations. Such screw extruders are employed in plastics applications such as, inter alia, polymer compounding, production, and finishing; incorporation of additives such as flame retardants, cross-linking agents, and plasticizers; production of polymer blends and alloys; development of multi-purpose of concentrates; incorporation of fillers and reinforcement materials' such as glass, talc, clay, carbon black, etc.; extraction of volatiles such as moisture, solvents, monomers, and oligimers; dispersion in size reduction of pigments; polymerization, pplycondensation, polyaddition, and grafting reactions. Screw extruders, including particularly twin screw extruders, are also employed in the continuous processing of rubber compounds and the production of powder coatings for appliances, automotive, architectural designs, lawn and garden items, general metal finishing items, and functional protective coatings as well as for direct extrusion of sheets and films, cross-linkable and foamable films, profiles, tubing, fiber spinning, wood fiber-plastic composites, and semi-permeable membranes. In other instances, screw extruders have been used in the production of commercial chemicals such adhesives and sealants, agricultural products, ceramics, elastomer production, starch modification, carbon extrusion, pharmaceuticals, petroleum additive processing, and energetics, as well as in the food industry for the production of snack pellets, chewing gum, final mixes, candy cooking and caramelizing, protein texturizing and pet food and for processes that include extrusion cooking and starch gelatinazation.

Screw extruder throughput, i.e., the rate at which a screw extruder can extrude one or more materials to make a particular product, directly affects the profitability of an overall process as well as the efficiency with which a market demand can be met. There is, therefore, always a need to improve the throughput of a screw extruder.

Additionally, as is well known in the industry, build-up of degraded material within a screw extruder, and again particularly a twin screw extruder, can produce adverse effects on the quality of the extruded product. Degraded material typically accumulates at dead zones within the extruder where the rate of fluid flow is either greatly diminished or static. Dead zones are the result of an interruption of the fluid flow within the extruder barrel that allows a portion of the subject material to degrade as a result of extended exposure to elevated temperatures and/or mechanical energy. Degraded material can form a solid coating on both the screw elements and barrel sections, and physical properties of a degraded material are often inferior to a virgin product. Portions of the degraded material often end up in the finished product and thereby reduce the overall product quality.

Efforts to remove degraded material, from screw extruders may typically involve running purge compounds through the extruder. However, there are instances where purging the extruders will not suitably cleanse the extruder. In these instances, the extruder must be at least partially dismantled and cleaned by hand. That is, cleaning out degraded material involves removing the screw, i.e., the conveying and kneading elements, from the extruder barrel and hand-cleaning both the screw(s) and barrel. Oftentimes, the extruders will have multiple shafts and each and every screw will need to be cleaned. Both of these methods, as well as any other cleansing methods, require that production be stopped, thereby resulting in lost of production and in expense incurred in failing to produce during down time.

There is, therefore, a need to eliminate dead zones with a screw extruder. In doing so, the relative rate at which degraded material forms within a screw extruder will be advantageously reduced. In addition, a need continues to exist, for a screw extruder assembly that can be cleaned easily and effectively so as to lower cleaning costs.

A number of differently configured conveying elements have been manufactured for use in modern screw extruders. Conveying elements are those elements of a screw whose essential purpose is to convey material through the extruder. To do so, they typically have extremely small clearances between them and the barrel or bore such that only a de minimus amount of material may be allowed to flow over the ends of the flights of the conveying element.

Typical conveying elements generally comprise one or more flights forming a generally spiral structure. For many conveying elements, two sets of opposing flights are employed and spirally wound around a central portion suitable for receiving the shaft of the extruder. By "opposed," it is meant that upon examining a cross-section of the element with these two flights, the flights will be opposite each other with the shaft receiving bore therebetween. Moreover, for conventional conveying elements, the slope of the flights will rise and fall consistently and, therefore, the ends of the elements will have a consistent elipscoidal or football-shape cross-section to them.

It is also known to use conventional conveying elements which have only one flight or as many as three flights on them. While the conveying elements having only one or three flights on them will not have opposing flights, or elipscoidal cross-sections, the slope of the flights will rise and fall in a generally consistent and uniform pattern which is well understood by those skilled in the art such that the peripheral profile of the conveying element will be convex in nature. For purposes of describing the present invention as compared to the prior art, the terms "conventional conveying elements" and/or "standard conveying elements" shall mean these types of elements.

However, not all conveying elements are conventional. Many extruders now employ "modified" conveying elements that are specially designed to improve the performance of the extrusions taking place. By the term "modified," it is meant that the conveying elements (and, later the kneading elements) do not have conventional, cross-sectional profiles of a completely convex nature. Generally, these modified. conveying elements may have differently angled or sloped flights with respect to each flight's front and back. That is, while the back slope of a flight may be essentially the same slope as for a standard conveying element, the front slope may be much steeper, or vice versa. Such a configuration of flights of the conveying element provides a completely different shape to the cross-sectional configuration of the conveying element. In the instance of a two opposed flight-modified conveying, element, the, element will have an "S-shaped" cross-section rather than a "football-shaped" cross-section; It will be appreciated that if both slopes are significantly steeper, then the cross-section configuration will be "narrower" at the tips of the flights. In this situation, the conveying element will have at least a part of the cross-sectional profile be concave in nature.

Such modified conveying elements having S-shaped cross-sectional profiles, hereinafter sometimes referred to as "S conveying elements," fare well-known in the art. However, while S conveying elements and other modified conveying elements have gained in popularity within the extrusion industry, the industry has continued to use conventional kneading elements. Those modified conveying elements having even narrower flights, i.e., are highly sloped on both the front and back of the flight, will sometimes be referred to hereinafter as "SS conveying elements."It will be appreciated that such S conveying elements and SS conveying, elements are typically differentiated and modified from those conventional. conveying elements having two "normal" opposing flights. However for the present invention, it will be understood that any modified conveying element modified to include a flight that provides a cross-sectional profile with at least a portion of the periphery thereof being concave in nature will be included as a modified conveying element, regardless of the number of actual flights.

In preparing a screw extruder for use, both conveying and kneading elements are typically used. Kneading elements are used not only to melt, mix and knead the extrusion mixture, as its name implies, but also to create a gap between conveying elements so that, where there are changes in the configuration, size or shape of the conveying elements or where the processing temperature or pressure might change, the kneading elements allow for these changes to occur over a greater period of time or along a length of the screw, not instantaneously, which could be deleterious to the extrusion mixture. Kneading elements are differentiated from conveying elements in that their essential purpose is to melt, mix and knead the materials that pass through the kneading zone of, the extruder. To do so, kneading, elements are designed to enhance flow between their periphery ridge (i.e., their outer edge) and the barrel or bore of the screw extruder as well, as between the kneading blocks themselves, as compared to conveying elements used for the same barrel or bore. This enhancement allows material to flow over the end of and between the kneading element which, in turn, allows for greater dispersion and/or distributive mixing of the material as compared, to that done in the conveying zone by the conveying elements.

Heretofore, conventional conveying elements and conventional kneading elements (conventional kneading elements being hereinafter defined as having the same cross sectional profile as the conventional conveying elements) were aligned in a contiguous manner such that the material being extruded would flow from the conveying element to the kneading element without being interrupted in any manner. However with the advent of modified conveying elements like those described above, it should be appreciated that, while the conventional kneading elements are commonly aligned and contiguous with the modified conveying elements, the interface between a modified conveying element that is aligned and contiguous with a conventional kneading element unfavorably creates an interruption in the material flow within a screw extruder. The interrupted material flow occurs because the cross-sectional profile of the conventional kneading element and the cross-sectional profile of the modified conveying element are peripherally incongruent. For example, where an S conveying element is used with a conventional kneading element, the S-shaped profile of the S conveying element does not match the football-shaped profile of the conventional kneading element. There is, therefore, a need to eliminate this cross-sectional peripheral incongruency between a modified conveying element and a kneading element.

SUMMARY OF THE INVENTION

Broadly, the present invention seeks to solve the problem of incongruency between a modified conveying element and a kneading element by reconfiguring the kneading element to match the cross sectional profile of the modified conveying element. It has been found that changing the profile of the kneading element to match that of the conveying element not only increases the free volume and potential input capabilities of a screw extruder, i.e. provides improved flow and throughput of a material through a screw extruder such as a twin-screw extruder, that employs the modified, i.e., non-conventional or non-standard, conveying elements contiguous with kneading elements in its screw configuration, but also decreases the amount of residue left or otherwise trapped in the screw extruder because of dead zones and the like. Thus, the screw extruder is most easily cleaned. Moreover, it has been surprisingly found that the "modified" kneading element produces more distributive mixing than would be associated with conventional, e.g., those having a football-shaped cross-section where two opposing flights are present, kneading elements. Such conventional kneading elements are also called Erdmenger kneading elements in some industries.

The advantages of the present invention over existing prior art relating to screw extruders and kneading elements used therein, which shall become apparent from the description and drawings which follow, are accomplished by the invention as hereinafter described and claimed.

In general, one or more aspects of the present invention may be accomplished by a kneading element comprising a central portion defining a root diameter having a shaft receiving bore defined therein; and at least one lobe extending radially from the central portion, the at least one lobe having an outer periphery ridge, and first and second lateral sidewalls; wherein one of the lateral sidewalls on the at least one lobe is concave between the outer periphery ridge and the central portion.

Other aspect of the present invention may be accomplished by a kneading block comprising a plurality of kneading elements, wherein at least one kneading element of said kneading block includes a central portion defining a root diameter having a shaft receiving bore defined therein, and at least one lobe extending radially from the central portion, the at least one lobe having an outer periphery ridge and first and second lateral sidewalls, wherein one of the lateral sidewalls of the at least one lobe is concave between the outer periphery ridge and the central portion.

Still other aspects of the present invention may be accomplished by a screw extruder comprising at least one modified conveying element having a particular, non-conventional, cross-sectional profile at at least one end of the conveying element, and at least one kneading element contiguously aligned with and adjacent to the conveying element, wherein the kneading element has a cross-sectional profile peripherally congruent to the cross-sectional profile of the conveying element at an end adjacent to the conveying element, such that the cross-sectional profile of the conveying element is peripherally congruent, aligned, and contiguous with a cross-sectional profile of the kneading element at adjacent ends.

Still other aspects of the present invention may be accomplished by a screw having a configuration formed by a modified conveying element contiguous with a modified kneading element wherein a cross-sectional profile of the modified conveying element is peripherally congruent, aligned, and contiguous with a cross-sectional profile of the modified kneading element.

Yet other aspects of the present invention may be accomplished by a kneading element having a cross-sectional profile that is peripherally congruent to a cross-sectional profile of a modified conveying element when the conveying and kneading elements are aligned and contiguous with each other.

DETAILED DESCRIPTION OF THE INVENTION

Figure 11:
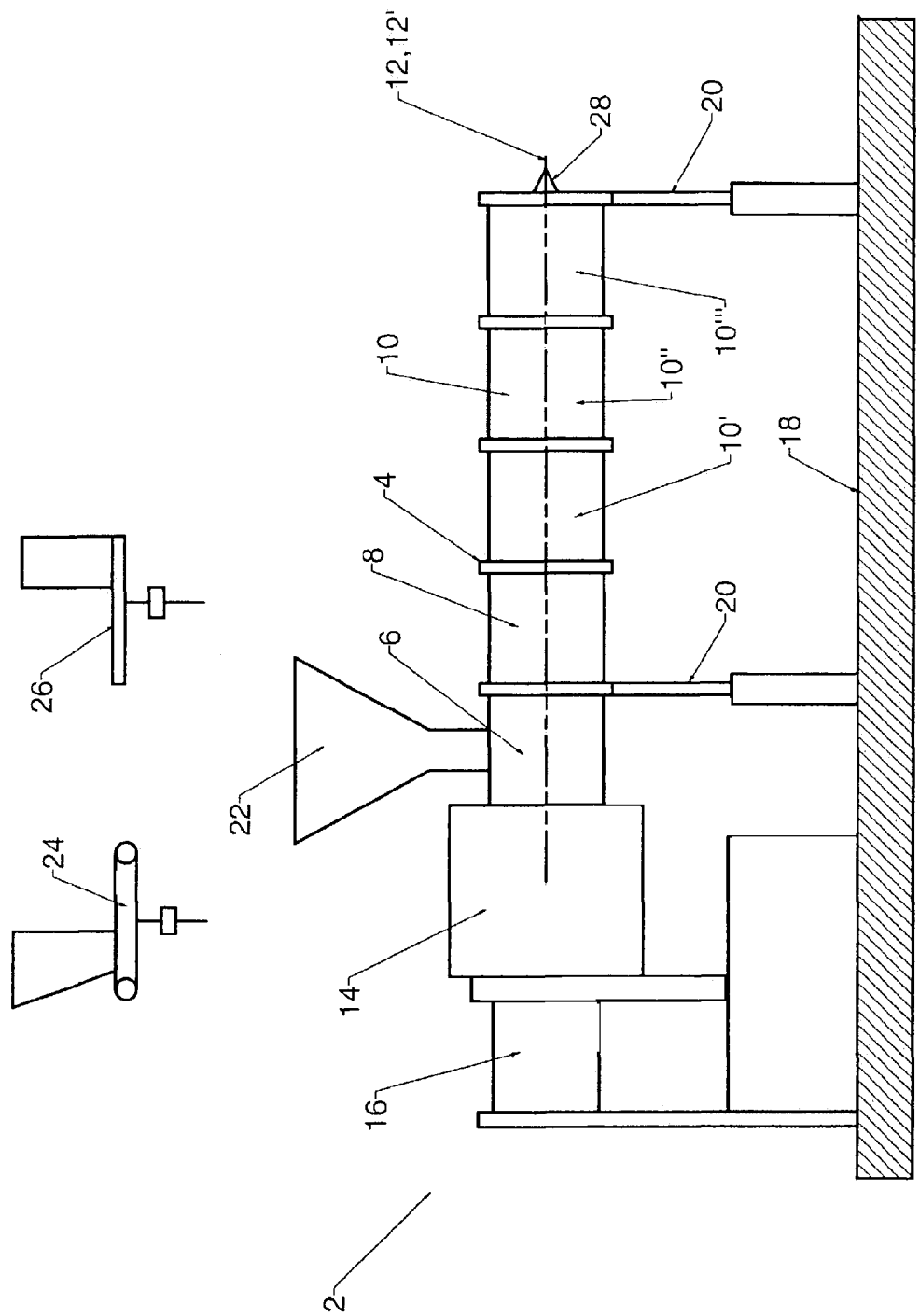
FIG. 11 is a schematic representation of a screw-type extrusion machine in which screw elements of the present invention are employable.

Screw extruders are well known in the art. There are at least two common types of screw extruders. One type is a single screw extruder, wherein there is one, set of axially-aligned mixing elements positioned on an axially-extending screw shaft within a generally cylindrical bore. The second common type of extruder is a twin-screw extruder, wherein there are two sets of axially-aligned mixing elements positioned side-by-side on two axially-extending screw shafts within a double barrel-like bore. Although the present invention is particularly suited for these types, of extruders, it is not necessarily limited thereto. Multiple shafts of eight or more have been made within a single bore, and may be relevant and a part of the present invention. One representative form of a screw-type extruding machine suitable for use in the present invention is presented generally as numeral 2 in FIG. 11. Screw-type extruding machine 2 has a housing 4 comprising a plurality of sections 6, 8, and 10 that are disposed axially, one behind the other, and flanged to one another. The housing section 10 comprises sections 10' 10", and 10'". A screw-receiving bore 12 may be defined axially by the housing 4. In a twin-screw extruder, there will be two barrels 12, 12' of parallel axes and of horizontal-figure-eight-type intersection, provided in housing 4. For purposes of the description of the extruder, a twin-screw orientation will be set forth throughout this description unless otherwise indicated. Concentrically of the axes of the barrels 12, 12', two shafts (not shown) are located in housing 4. These shafts may be driven via a gearbox 14 by a motor 16. Housing 4, gearbox 14, as well as motor 16 are supported by a base, such as ground 18, by way of stands 20. In use, a receiving hopper 22 discharges material to be processed into the first housing section 6 serving as a feed zone. The material to be processed may be supplied to the receiving hopper 22 by any means known in the art such as, for example, by a proportioning device 24 in the form of a conveyor-type weighing equipment for granulates, for instance, and/or by a proportioning device 26 in the form of a proportioning worm for powder, for instance. Some form of an outlet 28 is provided at a housing section 10. It will be appreciated that where twin screw drive shafts are employed, the drive of the axial shafts, via gearbox 14 and motor 16 is unidirectional, i.e., the shafts rotate in the same direction.

Figure 3:
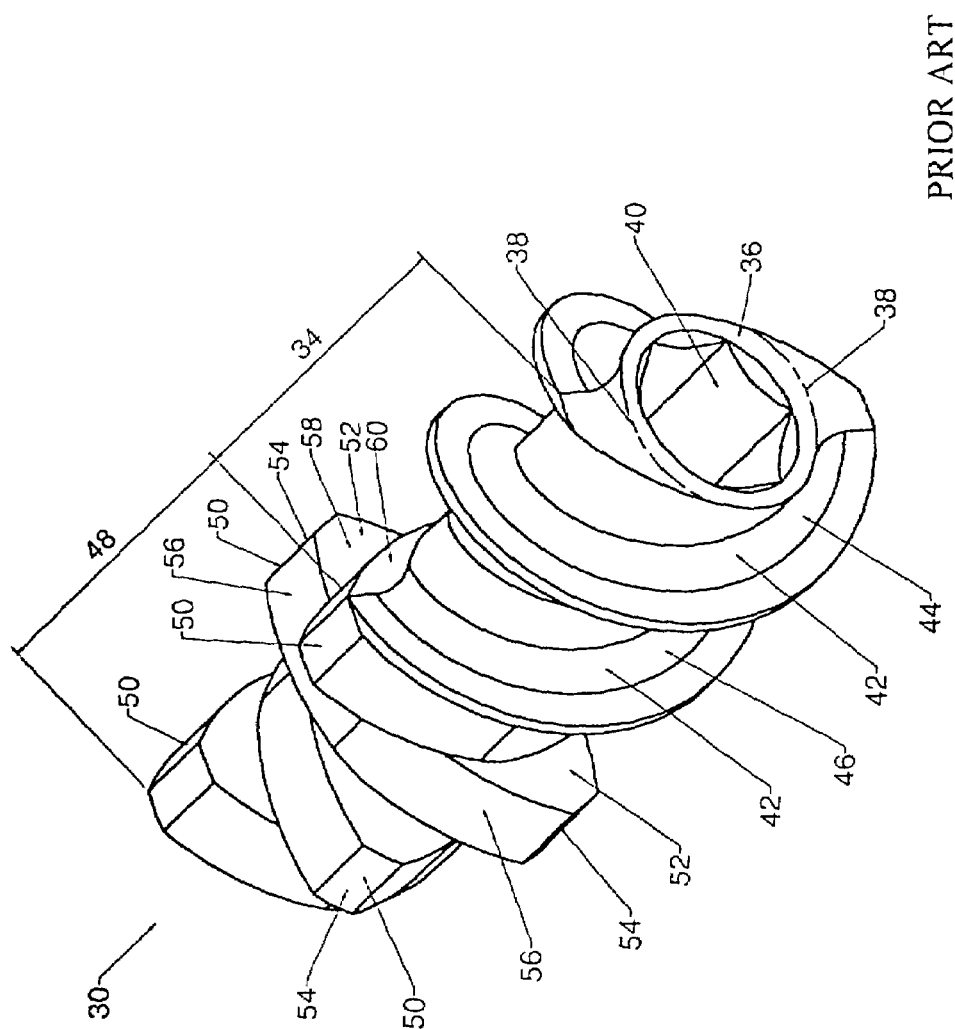
FIG. 3 is a perspective view of a conventional, prior art, kneading block comprising four (4) kneading elements and a known modified conveying element, also known as an "S conveying element," aligned and contiguous with the first kneading element of the kneading block.
Figure 5:
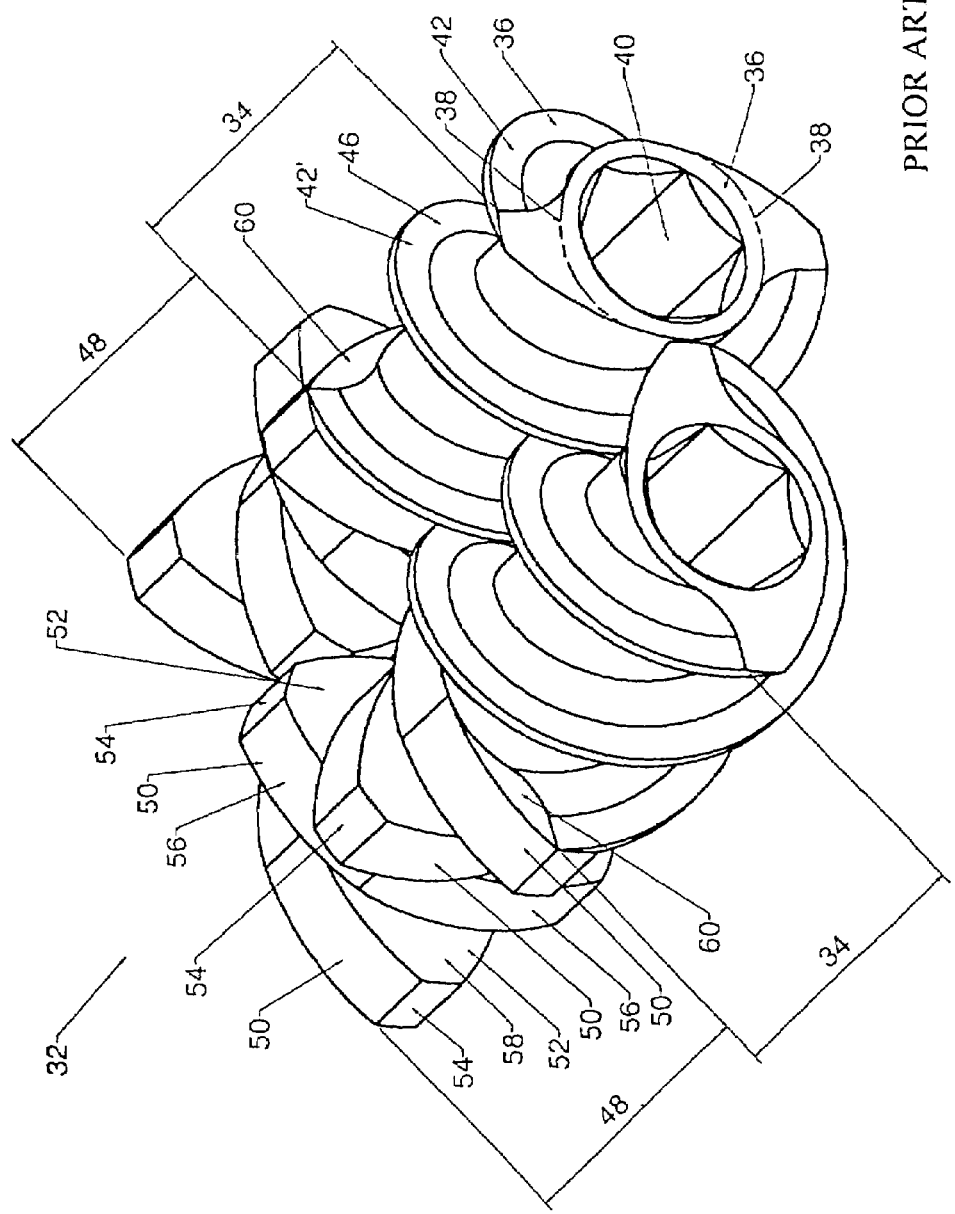
FIG. 5 is a perspective view of a twin-screw configuration wherein twin S conveying elements, as above, are each aligned and contiguous with the first of four conventional, prior art, kneading elements of a conventional, prior art, kneading block in a manner as shown in FIG. 3.

The axial shaft(s) within the mixing zone receives the screw(s) used to mix and extrude the material being processed. Both prior art, conventional screws having prior art, conventional and modified conveying elements and prior art, conventional kneading elements, and screws of the present invention having known modified conveying elements and modified kneading elements of the present invention can be employed and used in the configuration of the screws disposed in a housing section 10 subsequent to the feed zone. One such prior art screw configuration is shown in FIG. 3, as a single screw configuration represented generally by the numeral 30. In FIG. 5, another prior art configuration this time a twin-screw configuration; is represented generally by the numeral 32. In these prior art embodiments, a modified conveying element 34 having a modified, and more particularly, an S-shaped, cross-sectional peripheral profile generally has a central portion 36 where the chain lines 38 generally represent the outer limits of central portion 36. Within central portion 36 is a central shaft-receiving bore 40 extending axially for the length of modified conveying element 34. Modified conveying element 34, which may also be referred to hereinafter as an "S conveying element" for this particular embodiment, has at least one conveying flight 42, and preferably at least two opposed conveying flights 42, 42', extending axially from central portion 36 and traverses a spiral path around the axial length of central portion 36. It will be appreciated that the spiral path of the two conveying flights 42, 42' creates the S-shaped cross-sectional peripheral profile of S conveying element 34. However, it will also be appreciated that where fewer or more than two flights are employed, the peripheral profile will not be that of the S conveying element.

Notably, as a modified conveying element, the S conveying element 34 has asymmetrical slopes or curves 44, 44' and 46, 46' along an axial plane described by the front and back sides of each conveying flight 42, 42'. As best shown in FIG. 3, each side of the flight 42, 42' has a slope or curve 44, 44', 46, 46' extending from the central portion 36 of the conveying element to the outermost radial tip of each flight 42, 42'. A cross sectional profile of such a conveying, element may be deemed to be "non-conventional." In contrast and as noted hereinabove, a conventional conveying element with a conventional cross-sectional profile is defined as having symmetrical, convex slopes along an axial plane described by the front and back sides of a flight; each side of the flight has a curve or slope reaching from the central portion to the outermost radial tip of the flight.

Thus, one embodiment of the present invention provides a screw having at least one modified conveying element having a particular, non-conventional cross-sectional profile at at least one end of the conveying element. Preferably, the other end of the conveying element will also have the same non-conventional, cross-sectional profile. It will be remembered that conveying elements convey material through the extruder and have a relative smaller clearance between the end of the flight and the bore so that little, if any, material can escape over the end of the conveying element.

In addition to conveying elements however, the screw configuration also includes one or more kneading elements. Heretofore, only conventional kneading elements such as those shown by the numeral 50 in prior art FIGS. 3 and 5 in the form of conventional kneading blocks, indicated generally by the numeral 48, have been used in conjunction with the modified conveying element 34. As shown, conventional kneading block 48 includes a block of four kneading elements 50 it will be appreciated that any plurality of kneading elements, i.e., 2 or more, may form a block, with the alignment and arrangement of the elements being predetermined by one of skill in the art to provide particular mixing characteristics to during this stage of the mixing process. Thus, any arrangement or alignment of the elements within a particular kneading block may be employed without departing from the spirit and scope of the present invention.

With respect to the conventional kneading elements 50' shown in prior art FIGS. 3 and 5, each, like a conventional conveying element, generally includes a central portion (not shown) wherein a shaft-receiving bore extends axially the length of the conventional kneading element 50. In one embodiment, two opposed lobes 52 are defined generally as extending radially from the central portion. Each lobe 52 includes two opposing convex lateral sidewall 56 extending axially for the length or depth of the conventional kneading element 50 and extending radially from the central portion to an outer periphery ridge 54 positioned at the outermost tip of each lobe 52. A broad surface 58' can be found at both axial ends of each conventional kneading element 50 wherein the area of broad surface 58 is made up of the cross-sectional surface areas of opposed lobes 52 and the cross-sectional surface area of the central portion and wherein the periphery of the broad surface 58 basically defines the cross-sectional profile of the conventional kneading element 50. This "conventional" kneading element is often referred to as an Erdmrenger element.

Figure 7B:
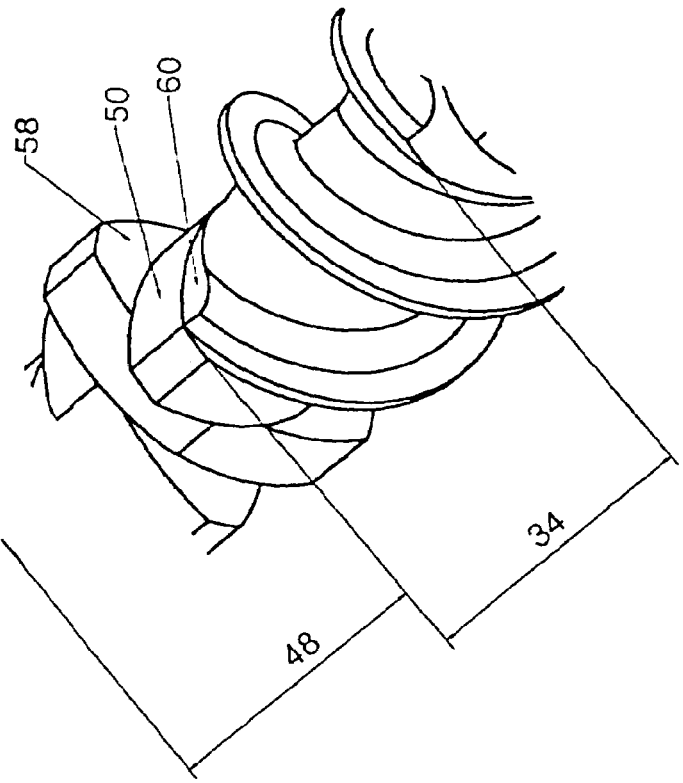
FIG. 7B is a fragmentary, perspective view of a screw configuration wherein an S conveying element, as above, and a first conventional, prior art, kneading element of a conventional prior art, kneading block is aligned and contiguous but not peripherally congruent to each other.

As best shown in prior art FIG. 7B, but also shown in prior art FIGS. 3 and 5, it will be appreciated that, while the cross sectional profiles of a conventional conveying element would match that of the conventional kneading element, the cross sectional profile of the modified S conveying element 34 does not match that of the conventional kneading element 50. Thus, when a conventional kneading element, such as 50, is contiguous and properly aligned with an S conveying element 34, the two are not peripherally congruent with each other. That is, a portion, as at 60, of broad surface 58 of the contiguous and aligned kneading element 50 is visible and may deleteriously affect the operation and performance of the screw. For example, the flow of material being processed may be interrupted causing processing delays. Moreover, the protruding broad surface may act as a dead zone where material may get caught or otherwise trapped in the screw, causing not only interrupted material flow, but also build-up of degraded material that can oftentimes only be cleaned by removal of the screw from the extruder.

Similarly, where modified SS conveying elements have been used with conventional kneading elements, the problem is even more exacerbated. In this instance, there are actually two "dead zones. " Not only does the material get caught in the "dead zone"; along the leading edge of the element, but there is also a "dead zone" on the trailing edge of the element with respect to the rotation of the screw element. Residues of the material being extruded regularly get left in these dead zones, and in the case of the zone trailing the flight, there is simply no, way to purge or remove it without physically cleaning the extruder.

To solve this problem, a kneading element has been developed as described herein. Notably, at least the kneading element that is contiguously aligned with and adjacent to the conveying element has a cross-sectional profile peripherally congruent to the cross-sectional profile of the modified conveying element at the end adjacent to the conveying element. Thus, there will be a smooth transition of the material being processed between the conveying elements and the kneading elements. In order to properly melt, mix and knead however, it will be understood that the clearance between the periphery ridge 54 and the bore will be sufficient large enough to allows flow over the end, of the ridge for proper dispersion and distributive mixing. This clearance, at a minimum, will be greater than the clearance between the end of the flight of the conveying element and the bore. Nevertheless, the congruency between the profiles of the elements has been found to result in a significant reduction in material build-up and degradation, providing for increased throughput and faster cleanup between various batches of materials.

Figure 4:
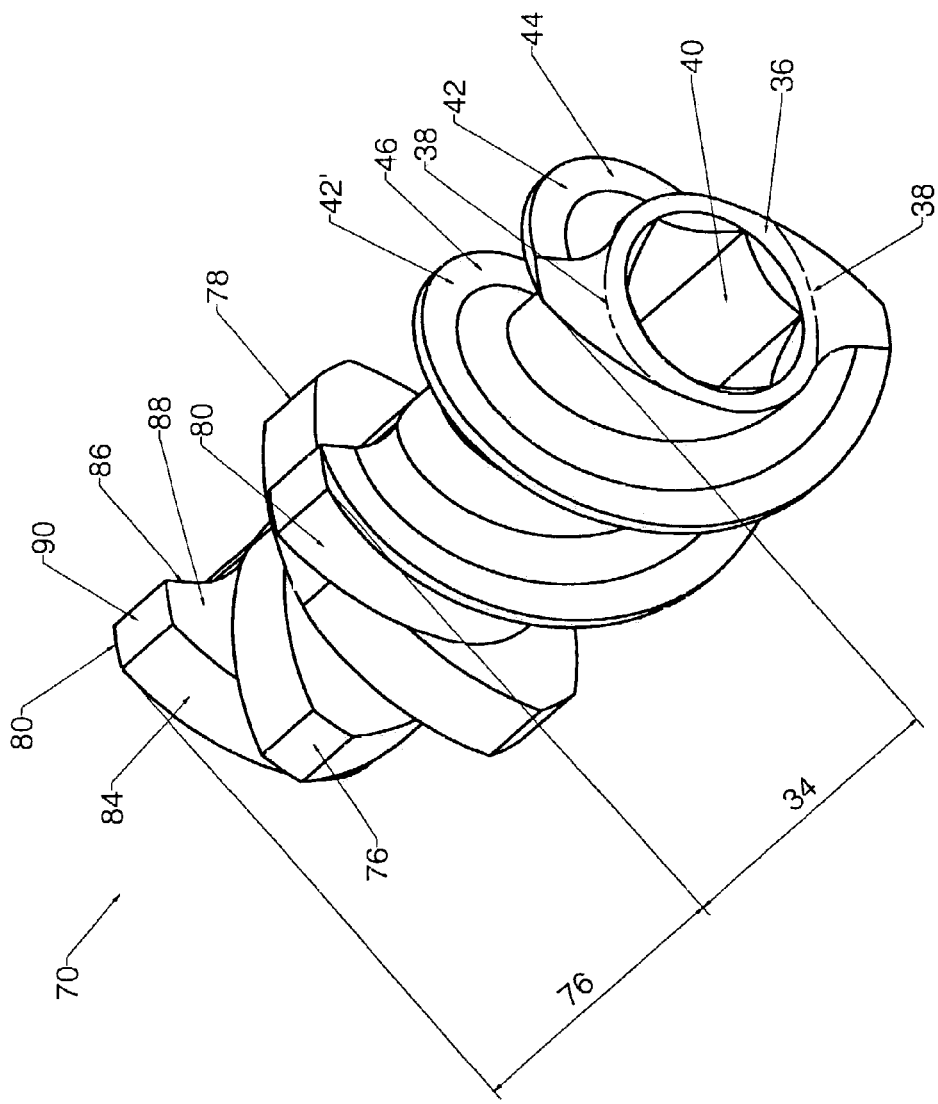
FIG. 4 is a perspective view of one embodiment of a modified kneading block of the present invention wherein the kneading block has four (4) kneading elements, the first and fourth elements being of the type hereinafter known as "S" kneading elements and the second and third being conventional prior art kneading elements, and wherein an S conveying element, as set forth above, is aligned and contiguous with the first S kneading element of the modified kneading block.
Figure 8:
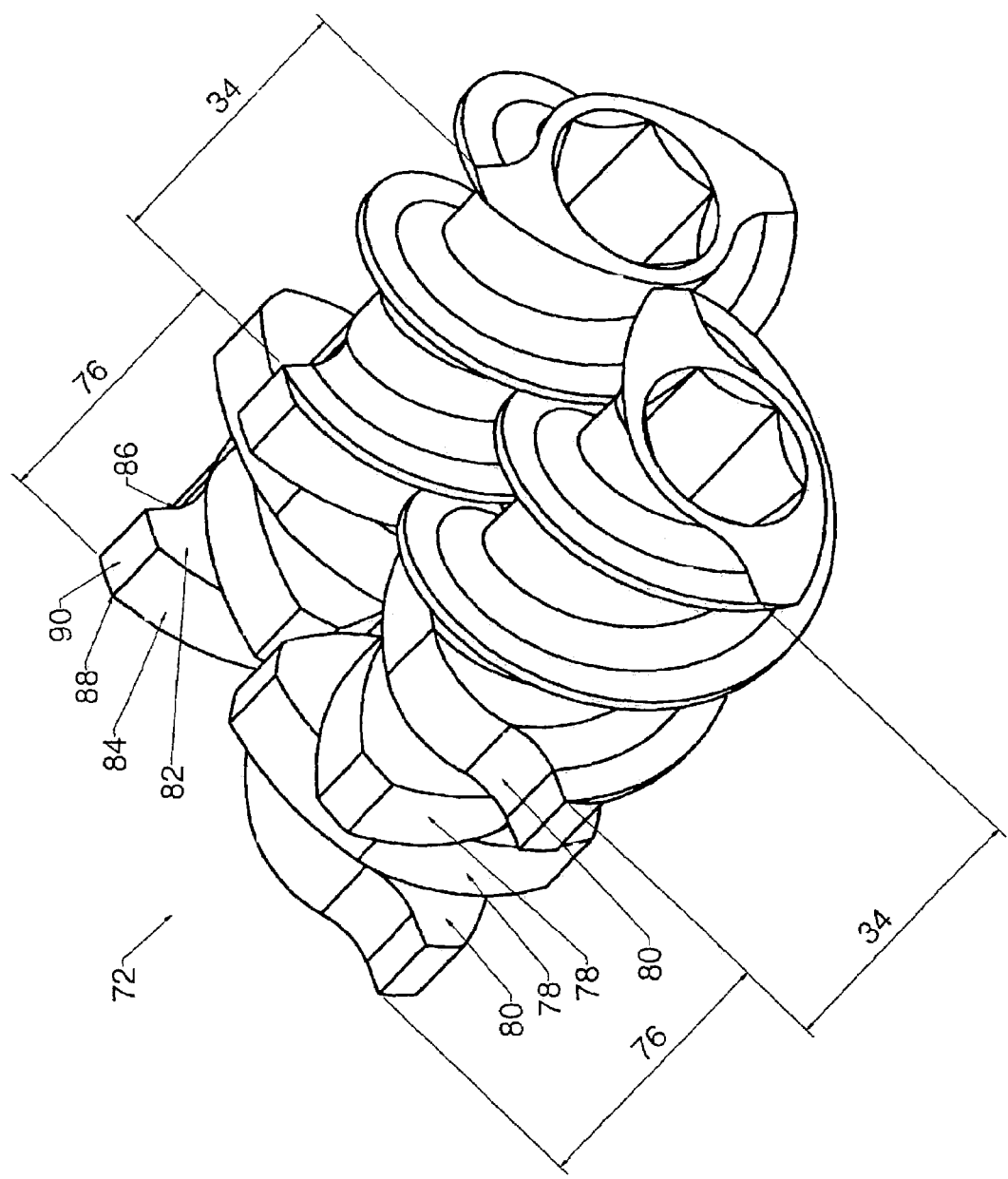
FIG. 8 is a perspective view of a twin-screw configuration wherein twin S conveying elements, as above, are each aligned, contiguous and peripherally congruent with the first of four kneading elements of an S kneading block of the present invention, the first kneading element of each block being an S kneading element of the present invention.

One representative embodiment of a screw configuration of the present invention is shown in FIG. 4, as a single screw configuration represented generally by the numeral 70, and again in FIG. 8 as a twin screw configuration represented generally by the numeral 72. In these embodiments, a modified conveying element 34 having an S-shaped cross-sectional peripheral profile, like that described hereinabove in FIGS. 3 and 5, is again shown. The description of the S conveying element was previously provided hereinabove and can be referenced with respect to FIGS. 4 and 8 as well. The screw has at least one modified conveying element having a particular, non-conventional, cross-sectional profile at at least one end of the conveying element, particularly the end contiguous with and adjacent to the kneading element.

Figure 7A:
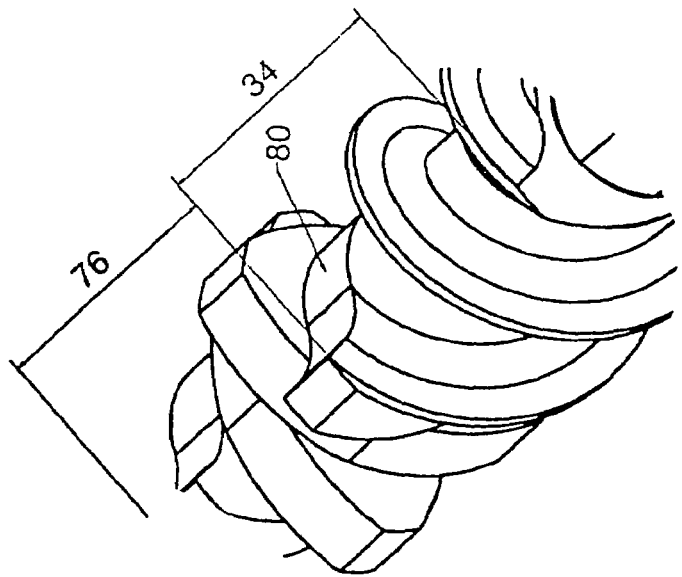
FIG. 7A is a fragmentary, perspective view of a screw configuration wherein an S conveying element, as above, and a first S kneading element, as above, of a modified kneading block of the present invention is aligned, contiguous, and peripherally congruent, to each other.

In the present invention, and as shown in FIGS. 4 and 8, at least one of the kneading elements 78, 80, and particularly at least the kneading element contiguous with and adjacent to each S conveying element 34, is modified in a manner such that the cross sectional profile of the modified S conveying element 34 matches that of the modified kneading element. Thus, when a modified kneading element, such as 80 in FIG. 7A, is contiguous and properly aligned with an S conveying element 34, the two are peripherally congruent with each other. That is, no portion of the contiguous and aligned kneading element 80 is visible so as to deleteriously affect the operation and performance of the screw.

It will be appreciated that proper alignment of the kneading element 80 with the conveying element 34 may be insured by the design features of the screw elements. In particular, most screw elements have locking mechanisms such that they may be placed on the screw shaft in only one particular way. Such locking mechanisms can include, but are not limited to, keys within the bores for of the screw elements so as to, align the shaft and screw elements.

As with the prior, art kneading elements, the kneading elements of the present invention such as those shown by the numerals 78 and 80 in FIGS. 4 and 8, are illustrated in the form of kneading blocks, indicated generally by the numeral 76. As shown, the kneading block 76 of the present invention includes a block of four kneading elements wherein the first and last kneading elements 80 are S-shaped and modified and wherein the second and third kneading elements 78 are conventional and football-shaped it will be appreciated that any plurality, of kneading elements i.e., 2 or more, may form a block, with the alignment and arrangement of the elements being predetermined by one of skill in the aft to provide particular mixing characteristics during this stage of the mixing process. However, at least the first or the last kneading element is preferably a modified kneading element as described in the present invention. In one embodiment, it is preferred that all of the other elements may be modified kneading elements, like 80. In another embodiment, it is preferred that only the first and last kneading elements be so modified. Thus, the total number (N) of modified kneading element per block may be based upon need and desirably of the manufacturer or user of the screw and can be determined without departing from the spirit and scope of the present invention.

With respect to the modified kneading elements 80 shown in FIGS. 4 and 8, each, like an S conveying element, generally includes a central portion (not shown) wherein a shaft-receiving bore extends axially the length of the conventional kneading element 80. At least one, and preferably two opposed, lobes 82 are defined generally as extending radially from the central portion. Each lobe 82 includes two opposing lateral sidewall 84, 86 extending axially for the length or depth of the kneading element 80 and extending radially from the central portion to an outer periphery ridge 90 positioned at the outermost tip of each lobe 82. However, rather than each lobe 82 having two convex sidewalls, at least one wall; such as 86, is concave. Preferably, the concave wall 86 of each lobe 82 is not the mirror image wall. That is, the concave wall 86 of each lobe is preferably the front or leading wall with respect to the rotation of the screw. A broad surface 88 can be found at both axial ends of each modified kneading element 80 wherein the area of broad surface 88 is made up of the cross-sectional surface areas of opposed lobes 82 and the cross-sectional surface area of the central portion and wherein the periphery of the broad surface 88 basically defines the cross-sectional profile of the modified kneading element 80.

Furthermore, it will be understood that, while for purposes of the present invention, a S-shaped cross-sectional profile has been shown and described, other configurations are possible since the kneading and conveying elements need only have one, and more often have two or three (or more) sets of flights which create the lobes 82 of the kneading conveying elements 80 of the present invention. Hence, for each lobe 82 having an outer periphery ridge 90 and first, and second lateral sidewalls 84, 86, at least on of the lateral sidewalls on the lobe is concave between the outer periphery ridge and the central portion.

It will be appreciated that kneading elements 78 in FIGS. 4, and, 8 are conventional kneading elements as previously described herein. Because the kneading elements are intentionally misaligned to provide a proper mixing and kneading environment, it does not matter whether the cross-sectional profiles of the middle kneading elements of a kneading block are conventional or modified. However, it has been found that improved distributive mixing characteristics may be imparted by the use of the modified S-shaped kneading elements within the kneading zone of the extruder. Some variations of the positioning of the elements in the blocks will provide better results in this respect than other variations. Also, the more kneading elements of the present invention employed the more distributive mixing conducted in the kneading zone.

With reference to FIG. 7A, but also shown in FIGS. 4 and 8, a kneading element 80 of a kneading block of the present invention having an S-shaped cross-sectional peripheral profile is employed as being contiguous with a peripherally congruent cross-sectional profile of a modified S conveying element. The two profiles are preferably peripherally aligned such that there is a smooth transition between the surfaces of the two contiguous elements. Such a smooth transition, i.e., lack of dead zones between the conveying element and the kneading element adjacent thereto will promote continuous material flow within a screw-type extruder, resulting in faster throughput and easier cleanup.

Figure 1:
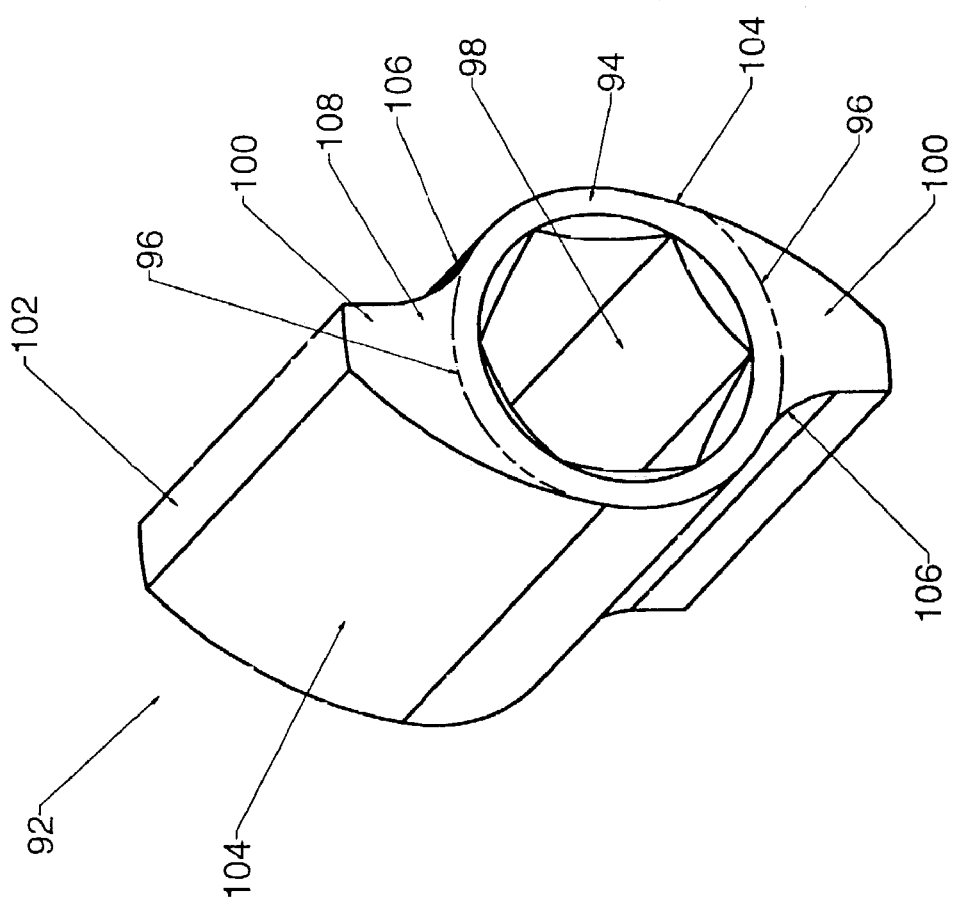
FIG. 1 is a perspective view of one embodiment of a modified kneading element of the present invention of the type known hereinafter as an "extended S" kneading element.

With respect to FIG. 1, another embodiment of a modified kneading element of the present invention is denoted generally by the numeral 92. The representative form of modified kneading element 92 is shown as having an axial length or depth which is much longer than that shown in FIGS. 4 or 8 such an "extended S" element preferably has an axial depth greater than the diameter of the shaft receiving. bore, therethrough, but only differs from kneading element 80 in that manner.

Thus, in FIG. 1, a modified kneading element 92, also referred to as an extended S kneading element, having an S-shaped cross-sectional peripheral profile generally has a central portion 94 where the chain lines indicated by numeral 96 represent the substantially circular outer limit of central portion 94. Within central portion 94 is a central shaft-receiving bore 98 extending axially for the length of modified kneading element 92. Two opposed lobes 100 extend radially from central portion 94 to an outer periphery ridge 102 at the radially outermost tip of each lobe 100. Each outer periphery ridge 102 defines a surface that is disposed generally equidistant from the outer limit of the central portion 94, with the periphery ridge being shorter in a circumferential direction than the circumferential length of the lobe 100 where the lobe 100 is attached to the central portion 94, i.e., at the chain line 96. Each lobe 100 has two lateral sidewall sections 104, 106 extending axially for the length of the extended S kneading element 92 and between the central portion 94 and periphery ridge 102. Notably, each lobe 100 has one lateral sidewall which is concave and the other which is convex. The concave sidewall is preferably the front face of the lobe 100 when the lobe is rotating. Thus, in FIG. 1, the modified kneading element would preferably turn in a clockwise direction. A broad surface 108 can be found at both axial ends of the extended S kneading element 92 wherein the area of broad surface 108 is made up of the cross-sectional surface areas of opposed lobes 100 and the cross-sectional surface area of central portion 94 and wherein the periphery of the broad surface 108 basically defines the cross-sectional profile of the modified kneading element. It is also noted that the broad surfaces of the modified kneading elements of the present invention preferably lie in parallel planes and are perpendicular to the shaft receiving bore.

Figure 6:
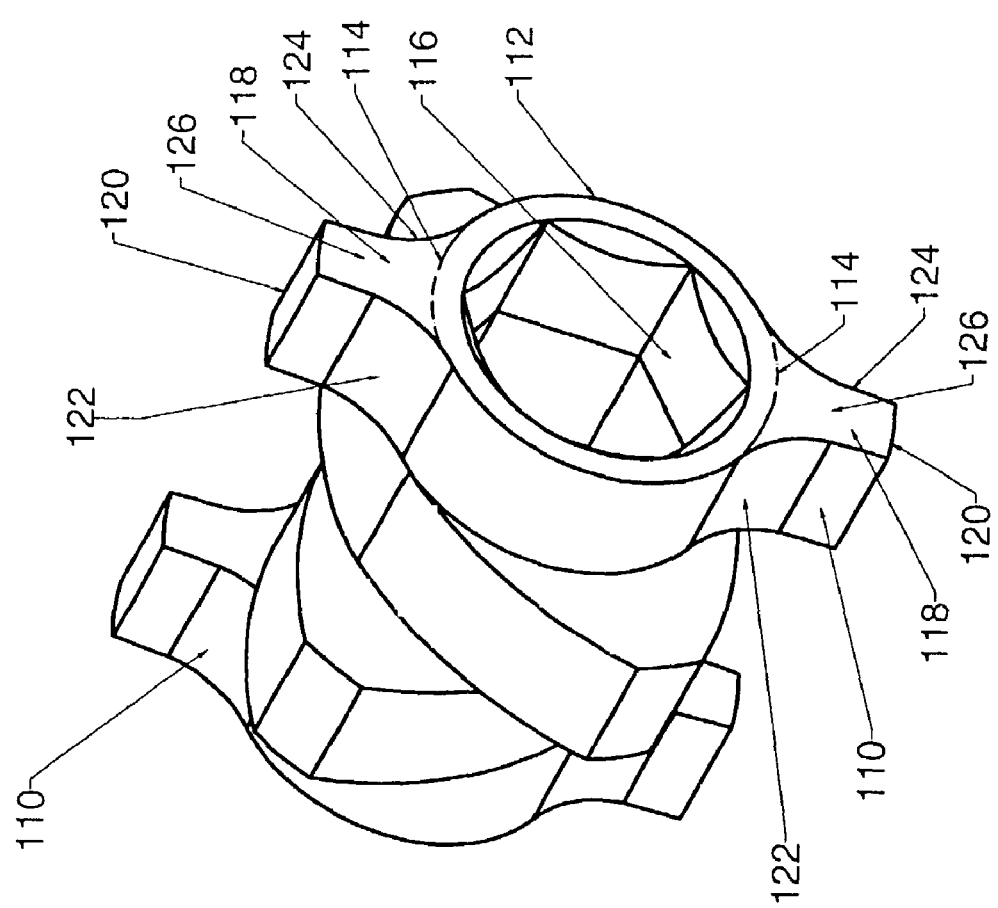
FIG. 6 is a perspective view of one embodiment of a modified kneading block of the present invention wherein the first and fourth kneading elements represent another embodiment of a kneading element of the present invention hereinafter known as "SS" kneading elements and wherein the second and third elements are conventional kneading elements.

Another representative form of a modified kneading element of the present invention is indicated generally by the numeral 110 in FIG. 6. Kneading element 110, also referred to herein as an SS kneading element, has a completely different cross-sectional peripheral profile. SS kneading element 110 generally includes a central portion 112 where the chain lines indicated by numeral 114 represent the substantially circular outer limit of central portion 112. Within central portion 112 is a central shaft-receiving bore 116 extending axially for the length of SS kneading element 110. Two opposed lobes 118 extend radially from central portion 112 to an outer periphery ridge 120 at the radially outermost tip of each lobe 118. Each outer periphery ridge 120 defines a surface that is disposed generally equidistant from the outer limit of the central portion 112, with the periphery ridge being shorter in a circumferential direction than the circumferential length of the lobe 118 where the lobe 118 is attached to the central portion 112, i.e., at the chain line 114. Each lobe 118 has two lateral sidewall sections 122, 124 extending axially for the length of the SS kneading element 110 and between the central portion 112 and periphery ridge 120. However, in this instance, both lateral sidewalls 122, 124 are concave, providing a much "narrower" cross-sectional profile to the SS kneading element 110. A broad surface 126 can be found at both axial ends of SS kneading element 110 wherein the area of broad surface 126 is made up of the cross-sectional surface areas of opposed lobes 118 and the cross-sectional surface area of central portion 112 and wherein the periphery of the broad surface 126 defines the cross-sectional profile of the modified kneading element. Again, the broad surfaces 126 of the modified kneading elements of the present invention preferably lie in parallel planes and are perpendicular to the shaft receiving bore.

Kneading elements of the type described above were more commonly be used in the melt zone of the extruder where it would not be subjected to as high a shear force as it might in other sections of the extruder. To that end, it should be recognized that the flights of the SS kneading element are generally weaker than the flights of the S kneading element or conventional kneading element, given that its cross-sectional profile is so much narrower.

Figure 2:
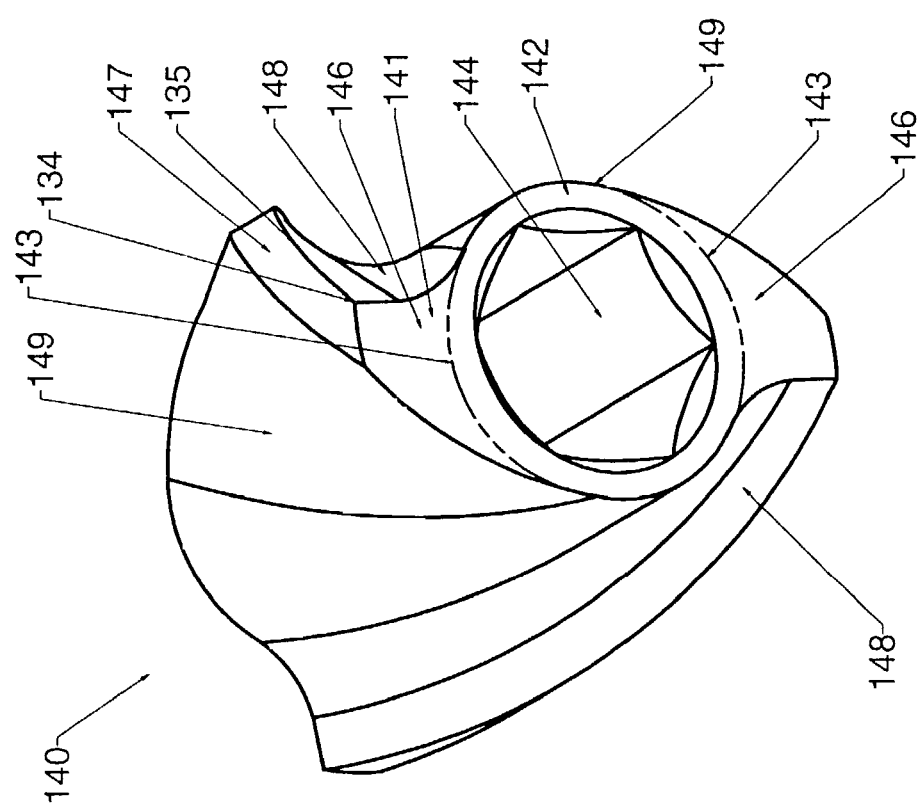
FIG. 2 is a perspective view, of another embodiment of a modified kneading element of the present invention of the type known hereinafter as an "extended twisted S" kneading element.
Figure 9:
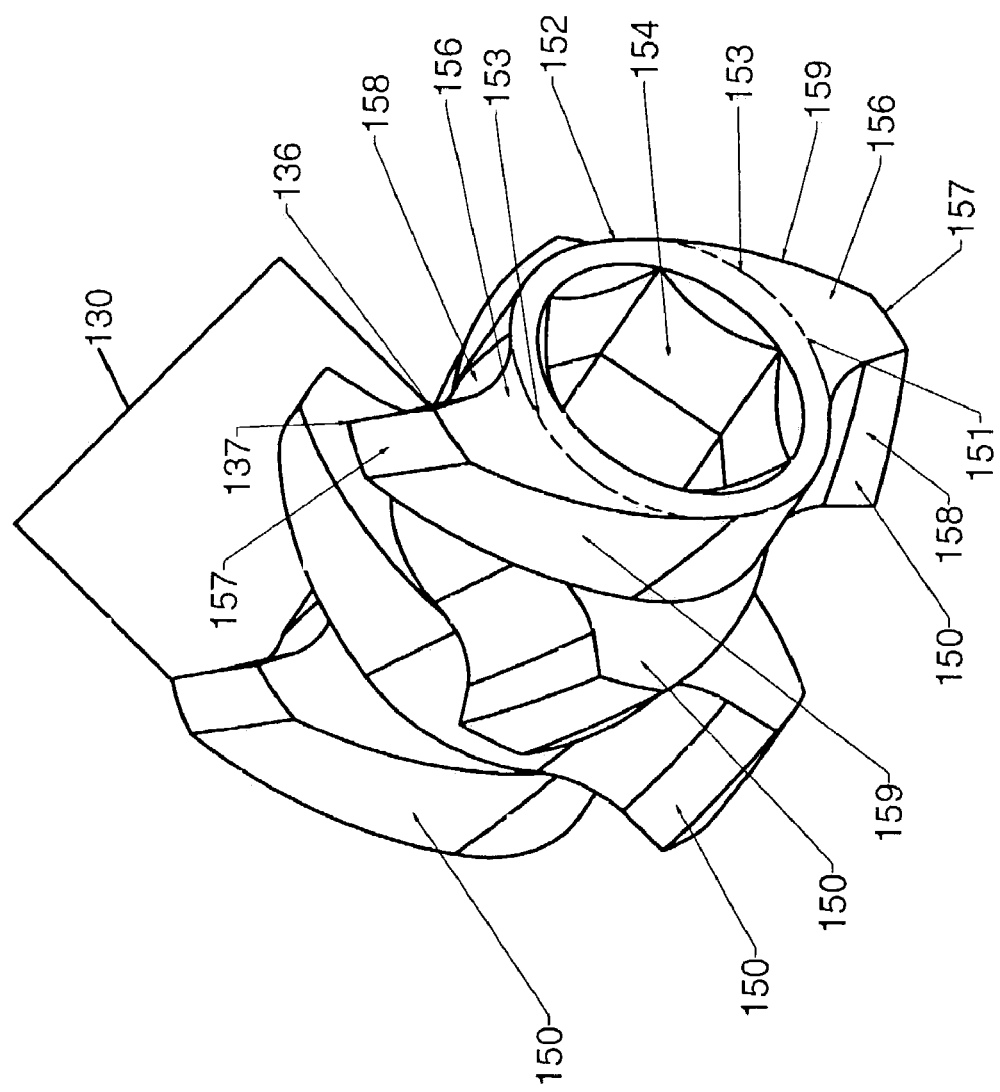
FIG. 9 is a perspective view of another embodiment of a modified kneading block of the present invention, wherein all four (4) modified kneading elements represent another embodiment of a kneading element of the present invention, hereinafter known as a "forward twisted S" kneading element.
Figure 10:
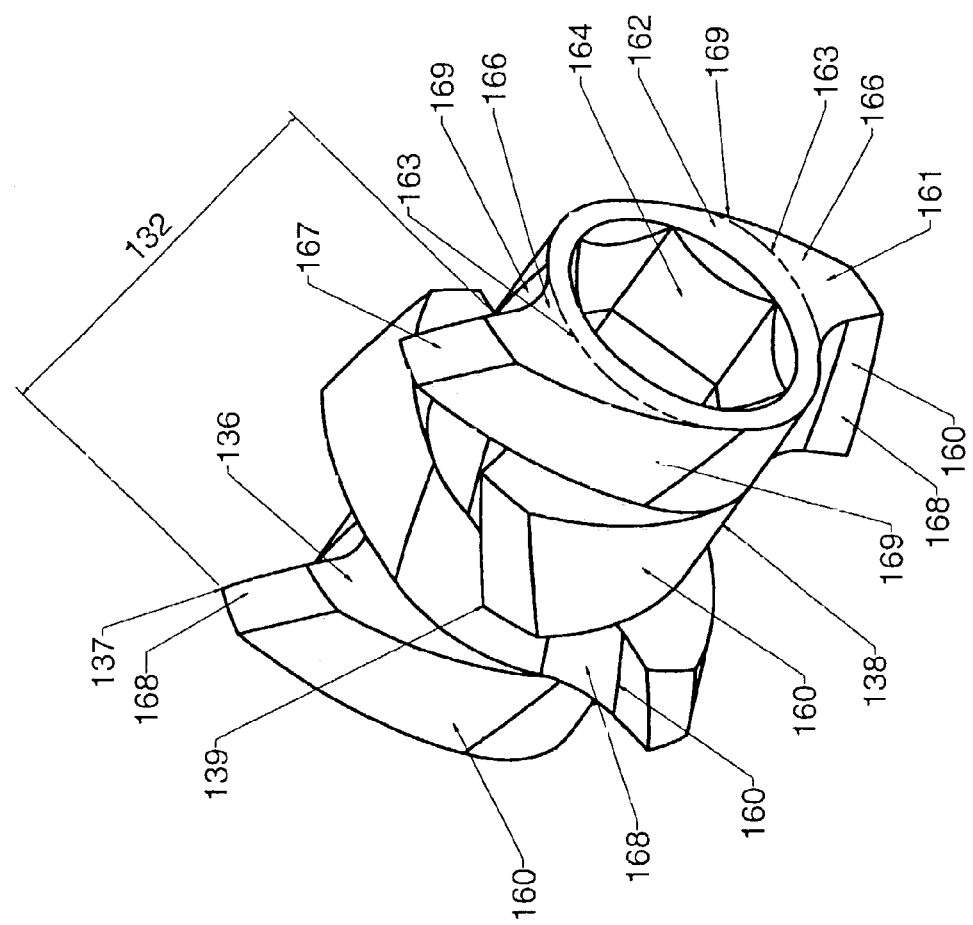
FIG. 10 is a perspective view of another embodiment of a modified kneading block of the present invention wherein the middle two (2) of the four (4) modified kneading elements represent another embodiment of a kneading element of the present invention hereinafter known as "reverse twisted S" kneading element.

Twisted kneading elements are still another representative form of a modified kneading element of the present invention, and they are presented in FIGS. 2, 9, and 10. Each of these kneading elements 140, 150, and 160, in FIGS. 2, 9, and 10, respectively, like the others, has an S-shaped cross-sectional peripheral profile. Each kneading element generally has a central portion 142, 152, 162 where the chain lines indicated by numeral 143, 153, 163 represent the outer limits of central portion 142, 152,162. Within central portion 142, 152,162 is a central shaft-receiving bore 144, 154, 164 extending axially for the length of modified kneading element 140, 150, 160. Two opposed lobes 146,156, 166 extend radially from central portion 142, 152, 162 to an outer periphery ridge 147, 157, 167 at the radially outermost tip of each lobe 146, 156, 166. Each lobe 146, 156, 166 has two lateral sidewall sections 148, 158, 168 and 149, 159,169 extending axially for the length of the S kneading element 140, 150,160, respectively, and between the central portion 142, 152, 162 and periphery ridge 147, 157, 167. Again, as with the other S kneading elements, each lobe 146, 156, 166 has one lateral sidewall that is concave and the other which is convex. A broad surface 141, 151, 161 can be found at both axial ends of the twisted kneading elements 140, 150, 160 wherein the area of broad surface 141, 151, 161 is made up of the cross-sectional surface areas of opposed lobes 146, 156, 166 and the cross-sectional surface area of central portion 142, 152, 162 and wherein the periphery of the broad surface 141, 151, 161 defines the cross-sectional profile of the modified kneading element.

It will be appreciated that forward twisted S kneading block shown in FIG. 9 and designated generally by the numeral 130, and reverse twisted S kneading block shown in FIG. 10 and designated generally by the numeral 132, differ only in their orientation of twisting with respect to the middle two modified kneading elements. However, significantly different, mixing characteristics can be accomplished by the two types of directional, twisted kneading blocks. In both FIGS. 9 and 10, the direction of flow of material is from the kneading elements (block) to the conveying element. Thus, the closest kneading element is the last kneading element of the block.

All of the elements of the kneading blocks 130, 132 are twisted. However, in FIG. 9, all of the kneading elements 150 are twisted such that the leading edge, as at 137, of the concave lateral sidewall 158 of each kneading element 150 is forward of the ending edge, as at 136, of the same sidewall 158. It will be appreciated that a gap or a spacer of up to 1 mm or more may be necessary to make these type of kneading blocks perform adequately in mixing and kneading the material within the extruder.

In FIG. 10, the first (farthest away),and last (fourth and closest) kneading elements 160 are twisted in the same manner as in FIG. 9. However, for the middle two elements 160', the elements are twisted such that the leading edge, as at 139, trails the ending edge, as at 138, of the same sidewall 168. Such an arrangement provides for slowing the flow of material as it attempts to reverse the flow of material. Such twisting with one or more reverse directional elements will provide a further increase in the amount of dispersion and distributive mixing that takes place within the kneading zone.

In FIG. 2, an extended S kneading element 140 is twisted in a forward direction, assuming flow from out of the paper, such that the leading edge, as at 135, of the concave lateral sidewall 148 of each kneading element 140 is forward of and leads the ending edge, as at 134, of the same sidewall 148.

It will be understood that a twisted kneading element may look similar to a conveying element. However, two characteristics clearly and succinctly differentiate these kneading elements from conveying elements. First, as noted hereinabove, the clearance between the end of the kneading element closest to the surface of the bore is greater than the clearance between the end of the conveying element closest to the surface of the bore. This allows for more flow over the end of the kneading element, resulting in more dispersion and distributive mixing as compared to a conveying element used in the same bore. Furthermore, if more than one kneading element is used, enhanced flow also occurs between the elements themselves. Second, the angle of the twisted kneading element is typically less severe than the angle (i.e., known in the industry as the "pitch") of the conveying element. Typically, conveying elements will have more than 2 diameter pitch while the kneading elements will not.

Hence, it should now be evident that the modified kneading elements of the present invention have a cross-sectional profile that, when aligned and contiguous with a cross-sectional profile of a modified conveying element, is peripherally congruent to that profile of the modified conveying element.

In operation, it will be understood that the screw configurations of the present invention are set forth in the barrel a screw extruder. The peripheral ridges at the tip of the kneading elements are aligned so that they substantially wipe the walls of the barrel and knead the material being processed, typically a polymer or other well-known compositions. For conventional kneading elements set forth in a twin screw extruder the kneading elements are aligned in a manner such that the sidewalls or peripheral ridges of one kneading element on one screw is always in close contact or proximity, to a similar kneading element on the other screw, thereby allowing the kneading elements to "wipe" against each other and knead the material over the peripheral ridges of the element.

However, because of the concavity of at least one of the sidewalls of the, modified kneading elements, it will be appreciated that during rotation of the twin screws, there is a point at which one kneading element is not in close contact to its counterpart on the other twin screw. That is, as the peripheral ridge, of one kneading element begins to swipe along the lateral sidewall of its counterpart kneading element on the other twin screw, a gap is formed between the peripheral ridge of the first kneading element and the concave sidewall of the counterpart kneading element. It has been found that this gap allows for a higher free volume of material to pass through the kneading zone of the extruder resulting in faster throughput of material and also providing improved distributive mixing without a perceptible loss of dispersion mixing capability within the kneading zone of the screw. High speed twin, screw extruders may further benefit by reducing the amount of shear rate in the kneading zone, allowing more sensitive materials to be processed without zone heating and degradation resulting therefrom.

In light of the foregoing, it should thus be evident that the present invention substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A kneading element for a screw extruder for plastics, rubber, and coating applications, the kneading element comprising:
   a central portion having a substantially circular outer limit and having a shaft receiving bore defined therein; and
   at least one lobe extending radially from said central portion, said at least one lobe having an outer periphery ridge and first and second lateral sidewalls, wherein one of said lateral sidewalls of said at least one lobe is concave between said outer periphery ridge and said central portion;
   wherein the outer periphery ridge defines a surface that is disposed generally equidistant from the outer limit of the central portion and the ridge is shorter in a circumferential direction than the circumferential length of the lobe where the lobe is attached to the central portion.

2. The element of claim 1, wherein the other of said lateral sidewalls on each lobe is convex between said outer periphery ridge and said central portion.

3. The element of claim 1 wherein the other of said lateral sidewalls on each lobe is concave between said first outer periphery ridge and said central portion.

4. The element of claim 1, wherein said element includes two opposed lobes.

5. The element of claim 1, wherein said element includes three lobes.

6. The element of claim 1 wherein said element is twisted.

7. The element of claim 1, wherein said element has an axial depth greater than the diameter of the shaft receiving bore.

8. The element of claim 7, wherein said element is twisted.

9. The element of claim 1, wherein said at least one lobe further includes first and second broad surfaces at the axial ends of the at least one lobe that are perpendicular to the shaft receiving bore and lie in parallel planes with each other.

10. A kneading block comprising a plurality of kneading elements for a screw extruder for plastics, rubber, and coating applications, each kneading element contacting at least a portion of at least one adjacent kneading element, and wherein at least one kneading element of said kneading block includes a central portion having a substantially circular outer limit and having a shaft receiving bore defined therein, and at least one lobe extending radially from said central portion, said at least one lobe having an outer periphery ridge and first and second lateral sidewalls, wherein one of said lateral sidewalls of said at least one lobe is concave between said outer periphery ridge and said central portion;
   wherein the outer periphery ridge defines a surface that is disposed generally equidistant from the outer limit of the central portion and the ridge is shorter in a circumferential direction than the circumferential length of the lobe where the lobe is attached to the central portion.

11. The kneading block of claim 10, wherein the other of said lateral sidewalls on each lobe is convex between said outer periphery ridge and said central portion.

12. The kneading block of claim 10, wherein the other of said lateral sidewalls on each lobe is concave between said outer periphery ridge and said central portion.

13. The kneading block of claim 10, wherein at least one kneading element includes two opposed lobes.

14. The kneading block of claim 10, wherein said kneading element includes three lobes.

15. The kneading block of claim 10, wherein at least one kneading element is twisted.

16. The kneading block of claim 10, wherein the block includes at least two kneading elements wherein one of the lateral sidewalls on at least one lobe is concave between said outer periphery ridge and said central portion.

17. The kneading block of claim 10, wherein the block comprises N number of kneading elements adjacent to each other, wherein all the elements have at least one lobe having first and second lateral sidewalls and wherein one of the lateral sidewalls on said at least one lobe is concave between said outer periphery ridge and said central portion.

18. The kneading block of claim 17, wherein each element is twisted in the same direction.

19. The kneading block of claim 10, wherein the block comprises N number of kneading elements adjacent to each other, wherein at least the first element of the block has at least one lobe having first and second lateral sidewalls and wherein one of the lateral sidewalls on said at least one lobe is concave between said outer periphery ridge and said central portion.

20. The kneading block of claim 10, wherein the block comprises N number of kneading elements adjacent to each other, wherein at least the last element of the block has at least one lobe having first and second lateral sidewalls and wherein one of the lateral sidewalls on said at least one lobe is concave between said outer periphery ridge and said central portion.

21. The kneading block of claim 10, wherein the block comprises N number of kneading elements adjacent to each other, wherein at least the first and last elements of the block has at least one lobe having first and second lateral sidewalls and wherein one of the lateral sidewalls on said at least one lobe is concave between said outer periphery ridge and said central portion.

22. A kneading block comprising a plurality of kneading elements, wherein at least one kneading element of said kneading block includes a central portion defining a shaft receiving bore and at least one lobe extending radially from said central portion, said at least one lobe having an outer periphery ridge and first and second lateral side walls, wherein one of said lateral side walls of said at least one lobe is concave between said outer periphery ridge and said central portion, wherein the block comprises N number of kneading elements adjacent to each other, wherein all the elements have at least one lobe having first and second lateral side walls and wherein one of the lateral sidewalls on said at least one lobe is concave between said outer periphery ridge and said central portion wherein there are at least three kneading elements, and wherein the first and last kneading elements are twisted in a first direction and wherein the other elements are twisted in an opposite direction.

* * * * *